United States Patent
Klein

(10) Patent No.: US 8,285,985 B2
(45) Date of Patent: Oct. 9, 2012

(54) SYSTEMS AND METHODS FOR DETECTING EXPOSURE OF PRIVATE KEYS

(75) Inventor: Udo Klein, Maximiliansau (DE)

(73) Assignee: SAP AG, Walldorf (DE)

( * ) Notice: Subject to any disclaimer, the term of this patent is extended or adjusted under 35 U.S.C. 154(b) by 967 days.

(21) Appl. No.: 12/314,671

(22) Filed: Dec. 15, 2008

(65) Prior Publication Data

US 2010/0153713 A1    Jun. 17, 2010

(51) Int. Cl.
*H04L 29/06* (2006.01)

(52) U.S. Cl. ............ 713/158; 713/156; 726/10; 726/30

(58) Field of Classification Search ........................ None
See application file for complete search history.

(56) References Cited

U.S. PATENT DOCUMENTS

| | | | | |
|---|---|---|---|---|
| 6,820,199 B2 * | 11/2004 | Wheeler et al. | ............... | 713/170 |
| 7,051,204 B2 * | 5/2006 | Pitsos | ........................... | 713/168 |
| 7,437,561 B2 * | 10/2008 | Beuque et al. | ................ | 713/176 |
| 7,536,544 B2 * | 5/2009 | Xiao | ............................. | 713/158 |
| 2002/0152382 A1 * | 10/2002 | Xiao | ............................. | 713/173 |
| 2003/0014629 A1 * | 1/2003 | Zuccherato | .................... | 713/156 |
| 2004/0054889 A1 * | 3/2004 | Pitsos | ........................... | 713/156 |
| 2004/0125959 A1 * | 7/2004 | Beuque et al. | ................ | 380/279 |

OTHER PUBLICATIONS

European Search Report for European Application No. EP 09 00 8152, dated Nov. 25, 2009.

* cited by examiner

*Primary Examiner* — Kaveh Abrishamkar

(74) *Attorney, Agent, or Firm* — Finnegan, Henderson, Farabow, Garrett & Dunner LLP

(57) ABSTRACT

A system and method can include comparing entities associated with public certificates and private keys in a keystore to detect compromised private keys. This increases security of systems implementing public key cryptography over a network. The comparison can be triggered by a trigger event in one embodiment. If a private key belonging to a certificate authority is detected, a notification can be generated. Alternatively or in addition, a revocation request can be generated for public certificates corresponding to the compromised private key.

20 Claims, 6 Drawing Sheets

SYSTEMS AND METHODS FOR DETECTING EXPOSURE OF PRIVATE KEYS

DESCRIPTION OF THE EMBODIMENTS

1. Field of the Embodiments

The embodiments relate generally to public key cryptography, and, more specifically, to systems and methods for detecting exposure of private keys.

2. Background

Today, many network communications utilize public key cryptography to help ensure secure exchanges of information. In public key cryptography, information encrypted with a public key generally can only be decrypted by a corresponding private key. A first entity holding the private key can generate numerous corresponding public keys, and gives one of these public keys to a second entity to use in communicating with the first entity. Across small private networks, exchanging keys for each transaction can satisfy privacy and security needs.

However, in all but the smallest networks, entities do not know or trust all users of the network, and an extra level of security is needed to establish trust in data exchanges. To meet this need, trusted third parties called "certificate authorities" provide public certificates that endorse identities of entities issuing public keys.

Each public certificate contains a digital signature of the certificate authority (i.e., trusted third party) that binds together a public key and identity of the entity issuing the public key. The digital signature is generated by a private key kept secret by the certificate authority. Anyone with access to the certificate authority's public key (which is usually deployed with user software) can verify the signature, proving authenticity of the public key bound to the identity inside the certificate. The identity contained in the certificate can include the name of a person or an organization, their address, and so forth. For example, the web address contained in the certificate can be compared against that of the website issuing the certificate to establish trust that the contained public key belongs to the website. The matching private key is kept secure by the owner that generated the key pair.

Computer operating systems and/or software can be deployed with public keys that correspond to certificates issued by certificate authorities. This pre-establishes a level of trust with respect to those certificates. For example, web browsers are shipped with around 50 root certificates already trusted. This allows a user of the web browser to trust the identity of websites that produce certificates digitally signed by recognized certificate authorities.

When an entity, such as a server, wishes to obtain a certificate, it makes a certificate request to a certificate authority. The request typically includes a public key for binding with the certificate, and can include other credentials that allow the certificate authority to identify the entity.

Because a certificate authority's private keys must remain private to ensure that only the certificate authority can issue public certificates, certificate authorities take strong measures to ensure that these private keys are not revealed to anyone. Although a certificate authority's private keys are very rarely compromised, it can happen. For example, when public keys for trusted certificates are deployed with software, the employees responsible for the deployment might mistakenly deploy one or more private keys as well. Although the private keys should be stripped out of the key pair, leaving only public keys for deployment, some employees might not fully understand this concept or might mistakenly believe this process has already occurred. Even though the recipient of the private key might not be a direct threat, the exposure of the private key indicates that the corresponding certificate authority can no longer be trusted.

When a certificate authority's private key is compromised, a variety of dangerous situations can arise, stemming from the ability to forge digital signatures and create false certificates. For example, a malicious third party who attains a private key can spoof a bank website and provide certificates that appear to come from a certificate authority, vouching for the authenticity of the bank's website. Thus, client software recognizing the digital signature will wrongly trust the identity of the entity running the fraudulent website. The user might then supply banking information that compromises the user's bank account. Such attacks are often called "man in the middle" attacks, though many other methods of abusing private keys are also possible.

Accordingly, systems and methods are provided herein for detecting when a certificate authority's private key has been compromised.

SUMMARY

In an embodiment, a computer-implemented method includes locating within a keystore first identities associated with certificates and second identities associated with private keys. The first identities represent certificate authorities associated with the certificates. The method can include comparing the first and second identities to determine if a match exists. Each match indicates a compromised private key. The corresponding certificates, therefore, cannot be trusted.

In one implementation, once a compromised private key is detected, a notification is generated and/or a revocation request is sent.

An embodiment herein may also include a computer-readable medium containing instructions for detecting compromised private keys. The instructions are executed by a processor to perform various stages. These stages can include identifying at least one exempt identity and identifying at least a second identity corresponding to at least one private key in the keystore. The processor may then compare the at least one exempt identity to the second identity to determine if a match exists. If a match does not exist, the processor can generate a notification.

In yet another embodiment, a system is provided for detecting compromised private keys. The system can operate on a client device, server, or both, and can include a memory and a processor. The interface can send and/or receive public certificates, and the memory can contain a keystore. In one embodiment, the processor can perform stages such as those described with reference to the computer-readable medium.

Additional objects and advantages will be set forth in part in the description which follows, and in part will be obvious from the description, or may be learned by practice of the invention. The objects and advantages will be realized and attained by means of the elements and combinations particularly pointed out in the appended claims.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of this disclosure, illustrate various embodiments and aspects of the present invention. In the drawings.

DESCRIPTION OF THE EMBODIMENTS

Reference will now be made in detail to the present exemplary embodiments, including examples illustrated in the accompanying drawings. Wherever possible, the same reference numbers will be used throughout the drawings to refer to the same or like parts.

As referred to herein, a computer-readable storage medium refers to any type of physical memory on which information or data readable by a processor can be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," can additionally refer to multiple structures, such a plurality of memories and/or computer-readable storage mediums. As referred to herein, a "memory" can comprise any type of computer-readable storage medium unless otherwise specified. A computer-readable storage medium can store instructions for execution by a processor and/or a keystore. Additionally, one or more computer-readable storage mediums can be utilized in implementing a computer-implemented method. The term "computer-readable medium" should be understood to include tangible items and exclude carrier waves and transient signals.

In one embodiment, a computer-implemented method for detecting compromised private keys can include examining a keystore in memory, by using the techniques described below, to determine the identities of certificate authorities. Methods consistent with the invention may then compare those identities with the identities associated with private keys in the keystore. A match, as described in greater detail below, may indicate the presence of a private key belonging to a certificate authority. This, in turn, may indicate the private key has been compromised, and a notification may then be generated.

In another embodiment, a list of exempt identities (e.g., corresponding to the computer implementing the method) is maintained. The identities associated with private keys in the keystore are compared against this list according to the techniques described below. If no match exists for a particular private key, then that private key has been compromised.

The term "keystore," as used herein, generally refers to any storage component of the various public and private keys used by a system. A keystore may thus represent one or more files, tables, or databases that track which certificates and private keys exist on the computer. A keystore may also correspond to one or more keystores. For example, while multiple applications on a single computer can maintain their own keystores in one embodiment, the term keystore may collectively refer to these individual keystores.

Figure 1A:
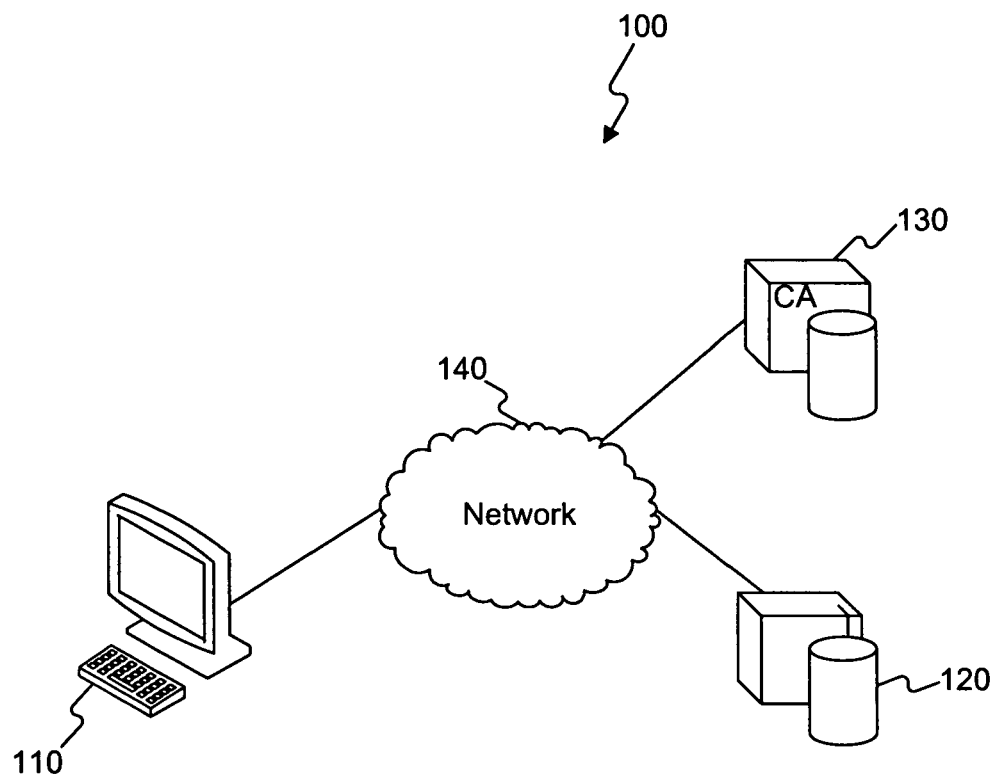
FIG. 1A is an exemplary illustration of a network having a server capable of detecting compromised private keys, in accordance with an embodiment.

FIG. 1A is an exemplary illustration of a system 100 capable of detecting compromised private keys, in accordance with an embodiment. As shown in FIG. 1A, system 100 may include a client device 110, a server 120, and a certificate authority 130, each of which may communicate with each other via a network 140.

Although a plurality of clients can connect to server 120 in an embodiment, only client device 110 is pictured in FIG. 1A. The client can include a personal computer, laptop, portable display apparatus (PDA), phone, or any other device capable of communicating with server 120 over network 140. As used herein, the term "computer" can describe any client device 110 or server 120. Similarly, server 120 can include one or more components or servers spread across a network.

Network 140 can include the Internet in one embodiment. Other networks are also possible, including Ethernet and local area networks. Network 140 can also be public or private network.

To establish the trust of client device 110, server 120 can provide a public certificate issued by certificate authority 130 along with a public key belonging to server 120. The certificate may include certificate authority's 130 digital signature, which can only be issued based on a private key belonging to certificate authority 130. If this private key is compromised, then the corresponding certificate can no longer be trusted. In such cases, for example, other entities might also have the private key, allowing them to forge digital signatures to create certificates associated with certificate authority 130.

In one embodiment, server 120 detects client device 110 communication over network 140 and a handshake occurs, in which server 120 sends the certificate containing the public key to client 110. Client device 110 verifies the digital signature with a corresponding (e.g., deployed) public key, recognizing that certificate authority 130 authenticates the public key included with the certificate as belonging to server 120.

In some cases, a certificate hierarchy might be utilized to establish trust. The hierarchy can include a second certificate within the first certificate, vouching for the identity of the first certificate authority. If client device 110 does not recognize the first certificate authority (e.g., does not have a corresponding public key), but does recognize the additional certificate (e.g., signed by a root certificate authority), then trust can be established down the chain of certificates. Many additional certificates can be included in the chain. In this way, client's 110 trust for server 120 is established even if client 110 does not recognize the authority of the first certificate.

However, a malicious third party can take advantage of this trust if the private key corresponding to the trusted certificate is, in actuality, no longer private. A malicious third party that possesses the compromised private key can make certificates that appear to have been issued by certificate authority 130, even though they are not.

Figure 1B:
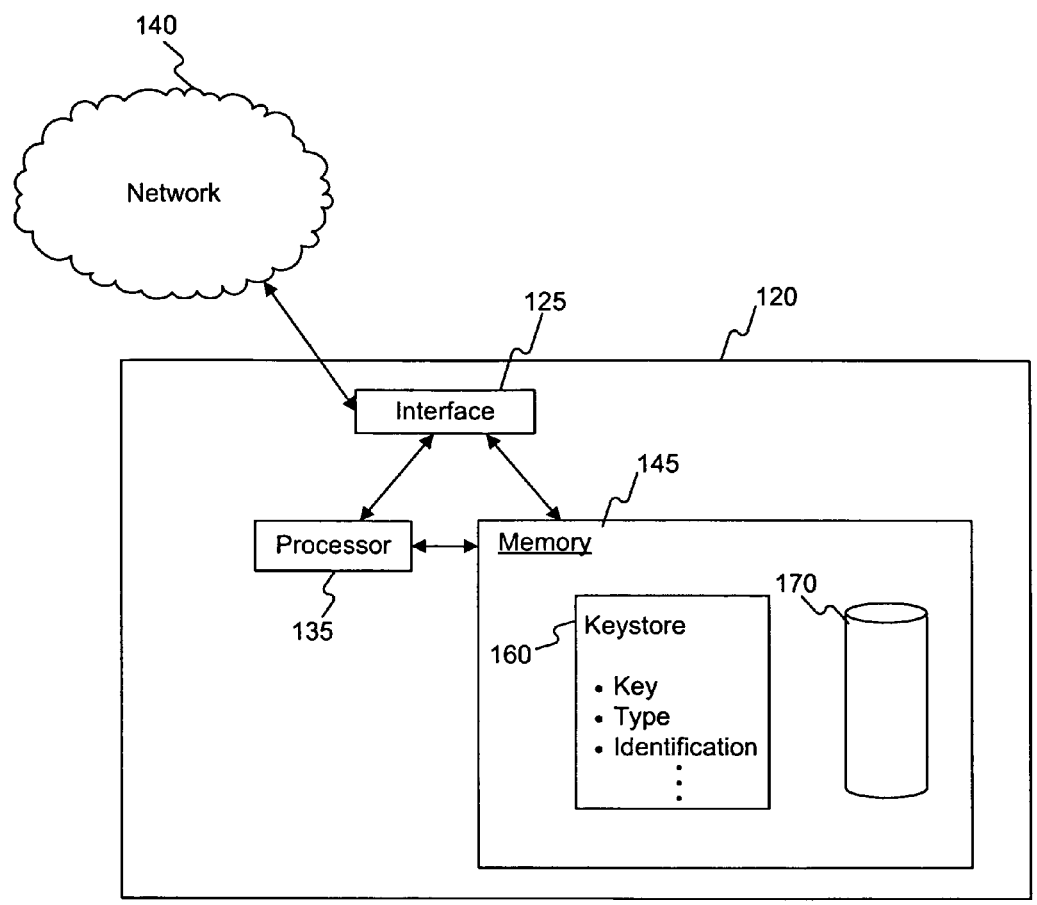
FIG. 1B is an exemplary illustration including a system for detecting compromised private keys, in accordance with an embodiment.

To prevent this hazard, in one exemplary embodiment consistent with the invention, server 120 and/or client device 110 can perform stages for detecting compromised private keys. FIG. 1B thus illustrates an exemplary implementation of server 120 for detecting compromised private keys. As shown in FIG. 1B, server 120 may include an interface 125, a processor 135, and a memory 145 that may further include a keystore 160 and a database 170. Although FIG. 1B illustrates such a system on a server 120, the system can also or alternatively exist on client device 110.

Interface 125 may receive and/or send data over network. For example, interface 125 may receive a request from client device 110, and, in response, send a public key and public certificate to client 110 over network 140. Interface 125 can comprise any known component for connecting to a network. In one embodiment, the interface is operatively coupled to processor 135 and/or memory 145.

In the exemplary embodiment, processor 135 is operatively coupled to a memory 145. Memory 145 can include one or more of any type of computer-readable storage medium.

Processor 135 may read the data of keystore 160 for purposes of detecting compromised private keys. For example, processor 135 can retrieve from keystore 160 first identities corresponding to any public certificates stored in keystore 160. The first identities can include identities of certificate authorities in one embodiment. Processor 135 can also retrieve from keystore 160 any second identities corresponding to any private keys in keystore 160. The second identities, therefore, can include entities associated with the private keys on server 120. The first and second identities can thus be compared to determine whether a match exists. If a match exists (e.g., server 120 includes both a private key and a public certificate of certificate authority 130), a compromised private key of certificate authority 130 exists on server 120. As a result, the corresponding public certificates from certificate authority 130 can no longer be trusted.

Alternatively, or in addition, processor 135 may compare the second identities to a list of predetermined exempt identities stored in memory 145. The exempt identities may include identities associated with server 120. Any private key associated with an exempt identity can be correctly stored on server 120. Therefore, in one embodiment, any second identity that is also an exempt identity cannot indicate a compromised private key. On the other hand, any second identity that does not match a predetermined exempt identity should not be on server 120, and corresponds to a compromised private key.

Figure 2A:
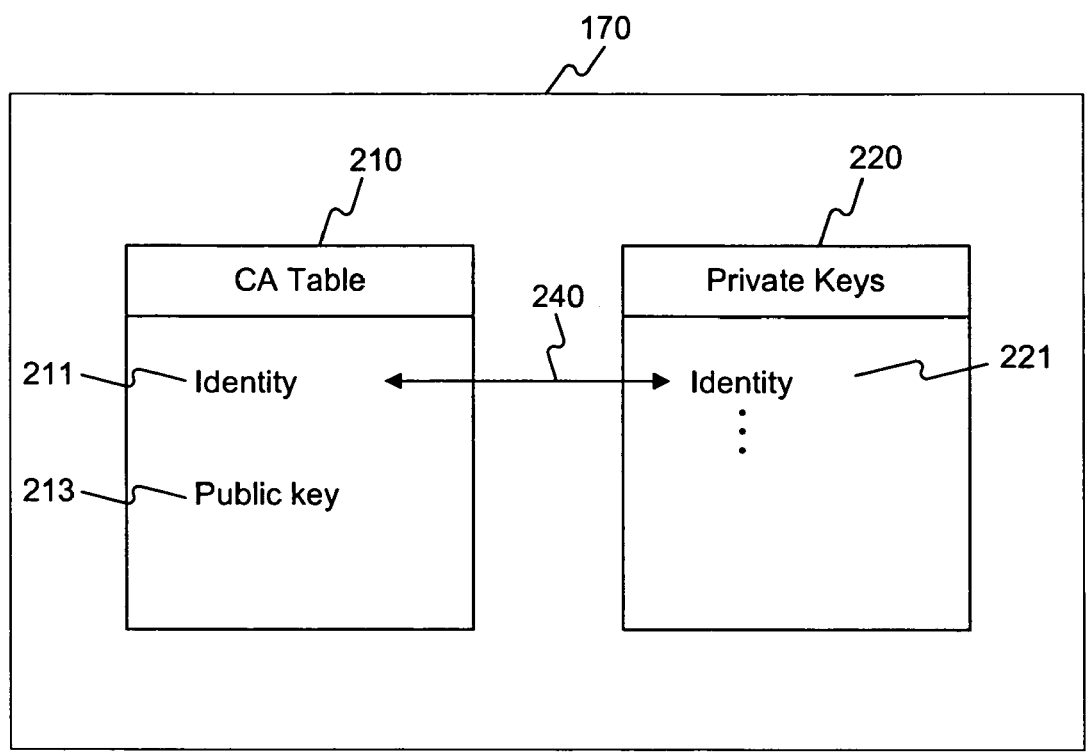
FIG. 2A is an exemplary table schema used in detecting compromised private keys, in accordance with an embodiment.

In systems consistent with the invention, server 120 may use database 170 stored on a computer-readable medium to perform the check for compromised private keys belonging to certificate authorities. As shown in FIG. 2A, database 170 can comprise a first table 210 and a second table 220. In this example, first table 210 can track the certificate authorities by storing at least the unique identities of the certificate authorities in a first identity column 211. In another embodiment, additional information identifying the corresponding public key can also be stored in first table 210, for example, in the public key column 213. First identity column 211 may be populated by retrieving first identities from keystore 160 for all public certificates and public keys in keystore 160.

Second table 220 may store second identities associated with private keys in a second identity column 221. First and second identity columns 211 and 221 can then be compared (as illustrated by arrow 240) to determine if any of the values contained in first identity column 211 match any of the values in second identity column 221. That is, processor 135 may compare a first identity associated with a public certificate to a second identity associated with a private key, the first identity being stored in column 211 and second identity being stored in column 221. Through this comparison, server 120 can determine whether a match exists and, thus, whether a compromised private key of certificate authority 130 exists on server 120.

Figure 2B:
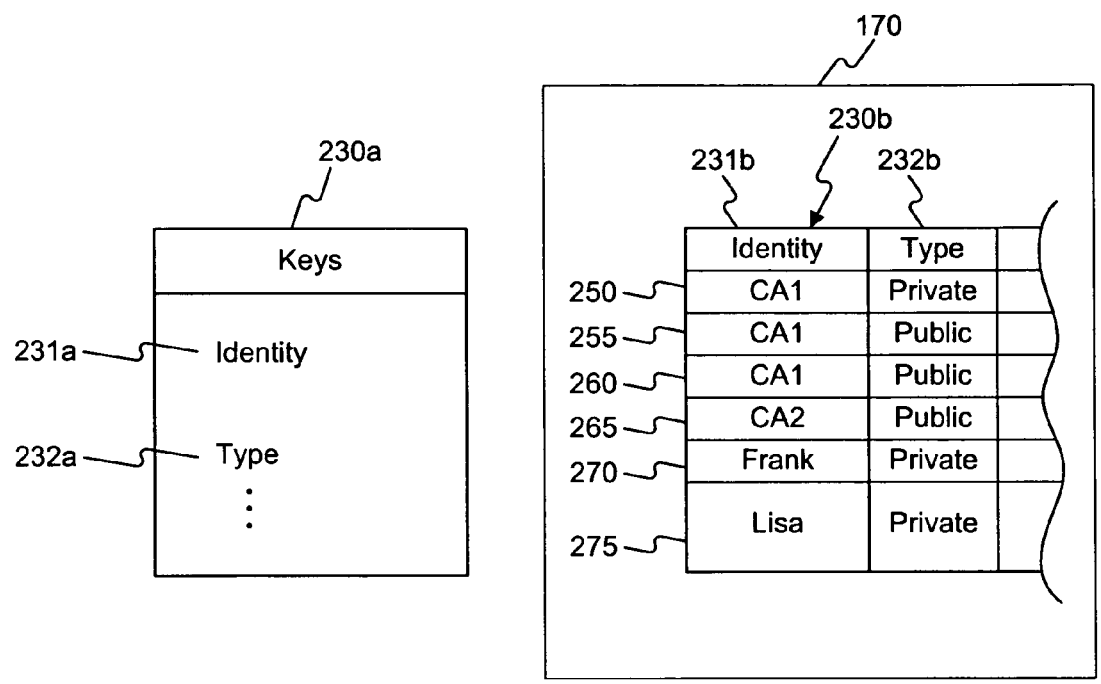
FIG. 2B is an exemplary alternate table schema used in detecting compromised private keys, in addition to an exemplary table of data arranged according to that schema, in accordance with an embodiment.

FIG. 2B illustrates an alternative exemplary implementation consistent with the invention. As shown in FIG. 2B, database 170 may include a single table 230a having an identity column 231a. Table 230b is an alternate view of table 230a, having an identity column 231b and a type column 232b, illustrating multiple rows of data entry 250, 255, 260, 265, 270, and 275.

Identity column 231b may store the identity of those entities corresponding to the public certificates and private keys stored in keystore 160. The correspondence between these identities and the certificates or private keys may be distinguished in type column 232b in one implementation. This is further illustrated with regard to table 230b, which illustrates six rows of data organized in this manner. Although, in this example, identity column 231b stores text data, such as "CA1" at 250 and "Frank" at 280, one skilled in the art will recognize that the identity can be represented by any data type or unit that allows matching the content of one identity to another. For example, the identity may comprise one or more data elements extracted from the keystore and/or can include hashing to allow for faster matching. Similarly, another embodiment might instead indicate private keys through use of a single bit or any other method, rather than through use of the text "private." However, for the purposes of clear illustration, text is used in this example.

Continuing with the single table embodiment of FIG. 2B, table 230b contains matching identity values at rows 250 and 255 that indicate a compromised private key. The identity 231b stored at row 250 corresponds to a private key, indicated by a type 232b of "private." Conversely, the identity 231b stored at row 255, with a matching "CA1" value, corresponds to a type 232b associated with a public certificate (e.g., a public key for recognizing the signature of a digital certificate). Therefore, "CA1" is a certificate authority, and its private key indicated at 250 should not be located on server 120 or any other system not associated with the certificate authority.

Conversely, rows 255 and 260 do not represent a match for the purpose of detecting compromised private keys. This is because, while the identities in both rows are the same, they both correspond to a public certificate, as indicated in column 232b. It is possible for several public certificates to reside on a single system that are digitally signed by the same certificate authority.

In one implementation, table 220 or table 230b may include a column for storing an identifier for the private key. The identifier can comprise a pointer to the private key or, alternatively, information that allows the system to locate the private key. In one implementation, when a match occurs, the system can locate the compromised private key based on the identifier, and begin a notification and/or revocation process, as discussed in further detail below.

Figure 2C:
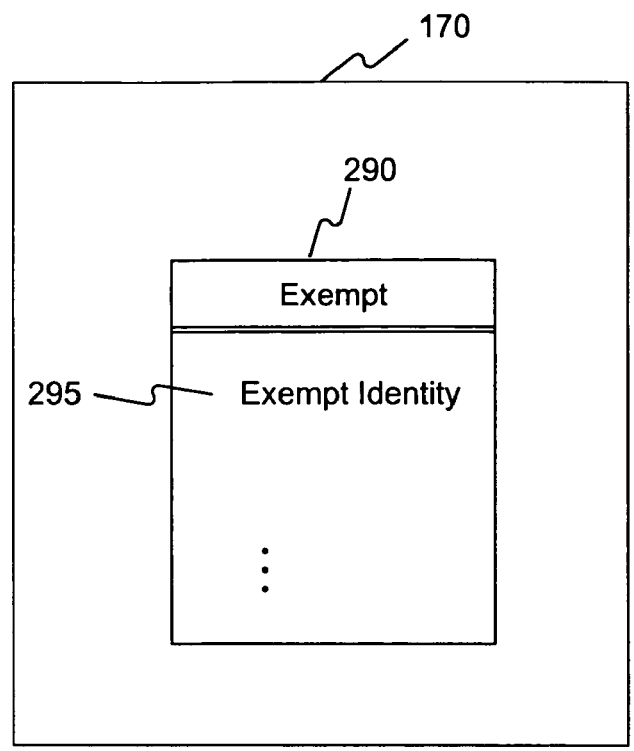
FIG. 2C is another exemplary table schema used in detecting compromised private keys, in accordance with an embodiment.

In yet another embodiment, exemplified in FIG. 2C, client 110 or server 120 may include a memory 170 storing an exempt identity table 290 containing a list of exempt identities 295 associated with the computer (e.g., client 110 or server 120) implementing the detection method. In this way, the identity of any public or private key issued by the computer should be an exempt identity contained in exempt identity table 290. Exempt identity table 290 can be preloaded with exempt identities 295 by a system administrator, in one implementation. In another implementation, creating a public key from a private key causes the system to check exempt identity table 290 and notify the system administrator if the private key is not associated with an exempt identity. In yet another aspect, exempt identity table 290 can be populated from keystore 160.

In one example, the computer (or some other processor) compares second identities (associated with private keys in at least one keystore) against exempt identity table 290. If a particular second entity does not match any exempt identity in the exempt identity table 290, then the corresponding private key has been compromised.

However, exempt identity table 290 may not be used in all embodiments because it may allow the possibility of a system administrator mistakenly exempting an identity that should not be exempt. Thus, systems consistent with the invention may not exempt any identities and may not use the exemplary implementation illustrated in FIG. 2C.

Further, systems and methods consistent with the invention may be implemented without the use of database 170 as described above. Because keystores typically do not have thousands of entries, database 170 may not be needed in some embodiments. Instead, keystore 160 can be searched and identities can be compared in memory 145, such as RAM. After the comparisons are complete, there may be no need to save the identities other than in keystore 160. In yet another embodiment, keystore 160 itself is maintained as one or more database tables, so additional tables may or may not be necessary.

In one embodiment, processor 135 may check only those identities associated with a newly added key. For example, if keystore 160 is updated to include an additional certificate (or public key for identifying the certificate), system 100 may check the identity associated with that certificate against the private key identities. However, in that example, system 100 may forego the task of checking other identities associated with public certificates that already existed in keystore 160.

Various trigger events can cause system 100 to check for compromised private keys. In one embodiment, any change to keystore 160 can trigger system 100 to check for compromised private keys. For example, as noted above, this trigger event can occur when a certificate or private key is imported or issued. Alternatively or in addition, system 100 can check for a matching identity and different type each time a new entry is added to table 230b. Similarly, in FIG. 2A, system 100 can check for a match when server 120 adds a new data row to either table 210 or 220. Tables 210 and/or 220 may be set up with triggers that start a procedure when a new table entry is made. In another embodiment, system 100 is programmed to update the relevant table(s) whenever keystore 160 changes, either by adding or removing entries.

A change to keystore 160 can also include the creation of a new keystore. In one embodiment, system 100 monitors whether new keystores have been added. The keystores can be tracked such that the check for compromised private keys can be performed across multiple keystores of system 100. In one embodiment, such as that described in FIGS. 2A and 2B, one or more tables can be maintained for all the identities in all of the keystores. In this way, a public certificate identity from a first keystore can be compared to a private key identity in a second keystore. However, in another embodiment, system 100 may not compare identities across different keystores, but may only check each keystore individually.

In one embodiment, server 120 may track changes to keystore 160 by storing a "last changed time" in keystore 160 and/or a secure hash of the entire keystore content. System 100 can also track the last time a check for compromised keys occurred. By comparing these two times, system 100 can determine if keystore 100 has changed since the last check. If a keystore has not changed, server 120 may bypass other trigger events for that keystore. However, in another embodiment, no bypass occurs, so that a compromised private key can be detected, for example, even if the keystore was updated without also updating the last changed time.

A trigger event may also occur at startup of system 100 or server 120. In this way, systems 100 may check for matching keys each time system 100 starts up, which might be nightly or weekly, depending on the system. A trigger event may also occur at predefined or random time intervals. For example, a random time interval may be used so a hack cannot predict when the check will occur. By checking for compromised keys at randomized intervals, system 100 can thus detect malicious changes to keystore 160 that might be injected and/or removed via a hack in, for example, the application libraries. In one embodiment, the random time interval is chosen to be between 1 and 43,200 seconds.

System 100 may also generate a notification concerning the compromised private key. Alternatively or additionally, system 100 may generate a revocation request. Generating a notification and revocation request are discussed more thoroughly below with respect to FIG. 3.

Figure 3:
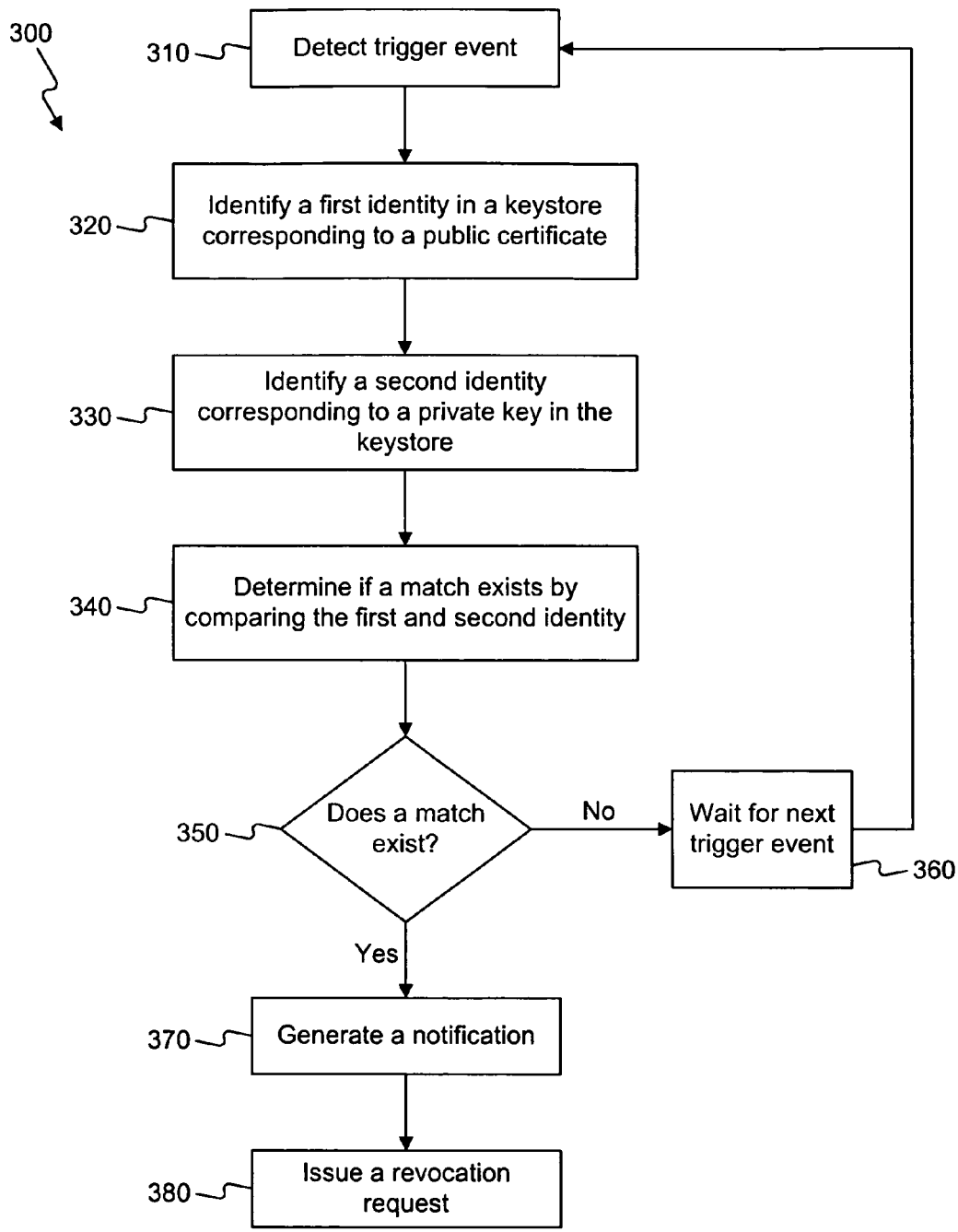
FIG. 3 is an exemplary flow chart including exemplary steps performed by a computer for detecting compromised private keys, in accordance with an embodiment.

FIG. 3 is an exemplary flow chart 300 of a process for detecting compromised private keys, in accordance with an embodiment. As shown in FIG. 3, step 310 can comprise detecting a trigger event. A trigger event can be a system startup, a change in keystore 160 (e.g., importing or publishing keys), an elapsed time interval, and other events described herein. System and methods consistent with the invention may, alternatively, not use a trigger event, and may instead have process 300 initiated manually by a user.

At step 320, process 300 may identify a first identity in keystore 160 corresponding to a public certificate. For example, processor 135 may pull or obtain the identities associated with the public keys in keystore 160 used to recognize the certificates. The obtained identities may also be based on digital signatures associated with certificates stored in keystore 160. The first identity may thus correspond to the certificate authority 130 that issued the public certificate. Additionally, this first identity can be one of a plurality of first entities identified in keystore 160 as corresponding with one or more public certificates. The first entities can be stored together in a list, a group, and/or a table for comparison with identities corresponding to private keys. Storing an identity can include storing any information, hash, or otherwise that can uniquely identify the entity associated with a particular key or certificate.

Step 330 can include identifying a second identity corresponding to a private key in keystore 160. The second identity can be one of a plurality of second entities identified in keystore 160 as corresponding with one or more private keys. The second identities can be stored together in a list, a group, and/or a table for comparison with identities (e.g., entities) corresponding to private keys.

At step 340, process 300 may then determine if a match exists by comparing the first identity to the second identity. Processor 135 may implement the comparison by using any technique known in the art for comparing two values. For example, the comparison can be between two table entries, or can occur between to entries in keystore 160.

Determining if a match exists at step 340 can also include, as described above, determining whether the second identity is an exempt identity, such as by comparing with an exempt value or exempt identity table. For example, if the second identity matches the an exempt identity associated with the computer (such as client device 110 or server 120), the corresponding private key belongs on the computer and should not be considered compromised. This technique can allow certificate authority 130 to perform process 300 without reporting its own private keys as being compromised. For example, in one embodiment, system 100 may not perform any further comparison if either the first or second identity is associated with the computer performing the method. In another embodiment, it is determined that no match exists at step 350, even if the first identity otherwise matches the second identity.

If no match exists at step 350, then client 110 or server 120 may wait for the next trigger event at step 360.

Conversely, at step 370 in one embodiment, after a match is detected at step 350, indicating a compromised private key associated with a certificate authority, system 100 may generate a notification. For example, if system 100 is running on a client device 110, a message might be presented to the user of client device 110. The message can alert the user that certificates from that certificate authority cannot be trusted.

In another implementation, generating a notification includes notifying a network security specialist (e.g., a person who overseas the security of server 120, such as a network administrator or security expert). For example, system 100 can store the specialist's email address, and send the notification to that email address. In another embodiment, generating the notification may comprise setting off an alarm or flag that the specialist will be able to see and/or hear.

Generating the notification can also comprise creating an entry in a log table that includes events for the specialist's review. The log entry can comprise details identifying the compromised private key, the matching certificate, the location and/or identity of the keystore, the date and time that the match was made, and/or the trigger event that led to the compromised private key being discovered.

The notification may also include a means for contacting the certificate authority associated with the compromised private key. For example, contact information associated with the certificate authority can be retrieved from keystore 160 for inclusion in the notification. In the alternative, the contact information can be retrieved from the matched certificate, which can contain a network address (e.g., web address) associated with the certificate authority and/or the address of a revocation center for the private key.

Returning to FIG. 3, at step 380, systems consistent with the invention may generate a revocation request for certificates generated based on the compromised private key. As required by some revocation centers, the compromised private key can be included with the revocation request. Including the private key may guarantee that no entity can forge the revocation request, because the private key should never be exposed. Therefore, this request may only be issued by the associated certificate authority or the entity that came into possession of the compromised private key. In one embodiment, the notification includes a button that the user can click to automatically issue a revocation request. In another embodiment, the revocation request may be generated automatically in response to detecting the compromised private key.

A revocation request can result in the certificate authority or another entity updating a certificate revocation list. The certificate revocation list can be stored at some central location and/or at the responsible certificate authority 130. Returning to FIG. 1A, client device 110, server 120, and/or certificate authority 130 can periodically check the certificate revocation list (not shown) via network 140. If the certificate is in the list, the certificate is considered revoked, and the server 120 and/or client device 110 do not use it.

A new certificate may be issued in some predetermined manner. For example, upon finding that a particular certificate is revoked, a client 110 and/or server 120 might be redirected to certificate authority 130. Alternatively, the entity housing the revocation list can be given a new public key by certificate authority 130, such that client 110 can simply exchange the old public key (corresponding to the compromised private key) for a new one (corresponding to a new private key).

In another embodiment, revocation is pushed to certificate holders rather than relying on the certificate holders to pull the revocation information from a centralized source. For example, following FIG. 1A, certificate authority 130 may keep a list of all entities, such as server 120, and addresses to which it has supplied a particular public certificate. Certificate authority 130 may send notices to those entities to alert them of the revocation. Alternatively or additionally, certificate authority 130 might deliver new replacement certificates to the entities. For example, certificate authority 130 might store the public keys tied to the original certificate requests. Therefore, when the original certificate is revoked, certificate authority 130 can create new public certificate(s) based on a non-compromised private key, binding the new certificate(s) with the public keys. Subsequently, the certificate and keys can be pushed to entities such as server 120.

As described herein, by comparing entities associated with public certificates and private keys in a keystore, systems and methods consistent with the invention allow for the detection of compromised private keys. By doing so, the above exemplary embodiments may increase the security of public key cryptography systems.

The foregoing description of possible implementations consistent with the present invention does not represent a comprehensive list of all such implementations or all variations of the implementations described. The description of only some implementations should not be construed as an intent to exclude other implementations. One of ordinary skill in the art will understand how to implement the invention in the appended claims in may other ways, using equivalents and alternatives that do not depart from the scope of the following claims.

The systems and methods disclosed herein may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter.

What is claimed is:

1. A computer-implemented method for detecting compromised private keys, the method comprising:

identifying, in a keystore of a computer device, a first identity corresponding to a public certificate associated with a certificate authority;

identifying a second identity corresponding to a private key associated with a certificate authority in the keystore;

determining if a match exists by comparing the first identity to the second identity; and generating, if the match exists, a notification that the private key has been compromised.

2. The computer-implemented method of claim 1, wherein determining a match exists further includes:

determining that the first identity does not correspond to an exempt identity.

3. The computer-implemented method of claim 1, wherein the first identity and second identity are stored in at least one table for use in the determining if the match exists.

4. The computer-implemented method of claim 1, wherein determining a match exists further includes:

detecting a trigger event; and determining if the match exists in response to the detected trigger event.

5. The computer-implemented method of claim 4, wherein the trigger event comprises a change to the keystore, and wherein determining if the match exists further comprises:

determining if a new private key is added to the keystore, and, if so:

identifying a third identity corresponding to the new private key; and comparing the third identity to the first identity; and determining if a new certificate is added to the keystore, and, if so:

identifying a fourth identity corresponding to the certificate; and comparing the fourth identity to the second identity.

6. The computer-implemented method of claim 4, wherein the trigger even occurs at random time intervals.

7. The computer-implemented method of claim 1, further comprising: issuing a certificate revocation request that includes the private key.

8. A tangible non-transitory computer-readable storage medium comprising instructions stored thereon for execution by a processor, the instructions causing the processor to perform a method comprising:

retrieving at least one exempt identity from an exempt identity table;

identifying, in a keystore of a computer device, at least a second identity corresponding to at least one private key associated with a certificate authority;

comparing the at least one exempt identity to the second identity to determine if a match exists; and generating, if a match does not exist, a notification.

9. The computer-readable storage medium of claim 8, the method further comprising detecting a trigger event prior to comparing the at least one exempt identity to the second identity.

10. The computer-readable storage medium of claim 9, wherein the trigger event includes detecting a change to the keystore.

11. The computer-readable storage medium of claim 8, the method further comprising monitoring for new keystores, wherein the trigger event includes detecting a new keystore.

12. The computer-readable storage medium of claim 8, the method further comprising issuing a revocation request based on the at least one private key corresponding to the second identity.

13. A system for detecting a compromised private key, the system comprising:

a memory containing a first keystore; and a processor operatively coupled to the memory, wherein the processor performs stages including:

identifying, in the first keystore, at least a first entity associated with at least one public certificate associated with a certificate authority;

identifying at least a second entity corresponding to at least one private key associated with a certificate authority in the first keystore;

comparing at least the first entity to the second entity to determine if a match exists; and generating, if a match exists, a notification.

14. The system of claim 13, wherein the processor is part of a server.

15. The system of claim 13, wherein the processor is part of a client device.

16. The system of claim 13, the stages further comprising detecting a trigger event prior to comparing at least the first identity to the second identity.

17. The system of claim 16, wherein the trigger event includes detecting a change to the first keystore.

18. The system of claim 13, the stages further comprising issuing a certificate revocation request to second entity after determining a match exists.

19. The system of claim 13, the stages further comprising:

monitoring in the memory for a new keystore; and comparing a third identity in the new keystore to determine if the match exists.

20. The system of claim 13, the memory further containing a second keystore, the stages further comprising:

identifying at least a third entity corresponding to a private key in the second keystore; and comparing the third entity to the second entity to determine if a match exists.

* * * * *